United States Patent
Ichikawa

(10) Patent No.: US 8,421,409 B2
(45) Date of Patent: Apr. 16, 2013

(54) NONCONTACT POWER RECEIVING APPARATUS FOR ELECTRICALLY-POWERED VEHICLE AND VEHICLE INCLUDING THE SAME

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/863,453

(22) PCT Filed: Sep. 19, 2008

(86) PCT No.: PCT/JP2008/066951
§ 371 (c)(1),
(2), (4) Date: Jul. 19, 2010

(87) PCT Pub. No.: WO2010/032309
PCT Pub. Date: Mar. 25, 2010

(65) Prior Publication Data
US 2010/0295506 A1    Nov. 25, 2010

(51) Int. Cl.
*H02J 7/00* (2006.01)
(52) U.S. Cl.
USPC .......................... 320/108; 320/104
(58) Field of Classification Search .................. 320/104, 320/108; 307/104
See application file for complete search history.

(56) References Cited

U.S. PATENT DOCUMENTS

| | | | | |
|---|---|---|---|---|
| 4,800,328 A | * | 1/1989 | Bolger et al. ................. | 320/106 |
| 5,243,269 A | * | 9/1993 | Katayama et al. ............ | 320/126 |
| 5,686,812 A | | 11/1997 | Hotta | |
| 5,710,502 A | * | 1/1998 | Poumey ........................ | 320/108 |
| 6,037,745 A | * | 3/2000 | Koike et al. ................... | 320/104 |
| 7,741,734 B2 | | 6/2010 | Joannopoulos et al. | |
| 2007/0115604 A1 | | 5/2007 | Zettel et al. | |
| 2007/0222542 A1 | | 9/2007 | Joannopoulos et al. | |
| 2008/0002322 A1 | | 1/2008 | Hirasawa | |
| 2008/0278264 A1 | | 11/2008 | Karalis et al. | |
| 2009/0195332 A1 | | 8/2009 | Joannopoulos et al. | |
| 2009/0195333 A1 | | 8/2009 | Joannopoulos et al. | |
| 2009/0224856 A1 | | 9/2009 | Karalis et al. | |

(Continued)

FOREIGN PATENT DOCUMENTS

| | | |
|---|---|---|
| AU | 2006269374 C1 | 1/2007 |
| AU | 2007349874 A2 | 10/2008 |

(Continued)

OTHER PUBLICATIONS

Kurs et al., "Wireless Power Transfer via Strongly Coupled Magnetic Resonances," *Science*, vol. 317, No. 83, pp. 83-86, Jul. 6, 2007.

(Continued)

*Primary Examiner* — Samuel Berhanu
(74) *Attorney, Agent, or Firm* — Oliff & Berridge, PLC

(57) ABSTRACT

A noncontact power receiving apparatus for receiving electric power from a power transmission coil transmitting the electric power received from a power supply includes: a power reception coil for receiving, by means of electromagnetic resonance, electric power transmitted from the power transmission coil; a rectifier for rectifying the electric power received by the power reception coil; a load supplied with the electric power rectified by the rectifier; and a first relay provided on a path over which the electric power is transmitted from the power reception coil to the rectifier, for cutting off the electric power.

13 Claims, 11 Drawing Sheets

U.S. PATENT DOCUMENTS

| | | |
|---|---|---|
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |

FOREIGN PATENT DOCUMENTS

| | | |
|---|---|---|
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| EP | 1 902 505 A2 | 3/2008 |
| EP | 2 130 287 A1 | 9/2009 |
| IN | 735/DELNP/2008 | 9/2008 |
| IN | 6195/DELNP/2009 | 2/2010 |
| JP | A-10-144194 | 5/1998 |
| JP | A-10-257681 | 9/1998 |
| JP | A-11-164497 | 6/1999 |
| JP | A-11-341713 | 12/1999 |
| JP | A-2000-354331 | 12/2000 |
| JP | A-2005-116485 | 4/2005 |
| JP | A-2006-320079 | 11/2006 |
| JP | A-2008-220130 | 9/2008 |
| JP | 2009-501510 A | 1/2009 |
| KR | 2008-0031398 A | 4/2008 |
| KR | 2010-0015954 | 2/2010 |
| WO | WO 00/54387 | 9/2000 |
| WO | WO 01/18936 A1 | 3/2001 |
| WO | WO 2007/008646 A2 | 1/2007 |
| WO | WO 2008/118178 A8 | 10/2008 |

OTHER PUBLICATIONS

International Search Report issued in Application No. PCT/JP2008/066951; Dated Dec. 16, 2009 (With Translation).

May 8, 2012 Office Action issued in JP Application No. 2010-529541 (with English translation).

Jul. 31, 2012 extended European Search Report issued in EP Application No. 08876977.3.

* cited by examiner

NONCONTACT POWER RECEIVING APPARATUS FOR ELECTRICALLY-POWERED VEHICLE AND VEHICLE INCLUDING THE SAME

TECHNICAL FIELD

The present invention relates to a noncontact power receiving apparatus and a vehicle including the noncontact power receiving apparatus, and particularly to a technique of supplying electric power in a noncontact manner to a vehicle from a power supply external to the vehicle.

BACKGROUND ART

Electrically-powered vehicles such as electric vehicles and hybrid vehicles are of great interest as they are environmentally-friendly vehicles. These vehicles are each mounted with an electric motor generating driving force for the vehicle to travel as well as a rechargeable power storage device storing electric power to be supplied to the electric motor. The hybrid vehicles refer to those including a vehicle mounted with an internal combustion engine as a source of motive power in addition to the electric motor, and a vehicle mounted with a fuel cell as a source of DC (direct current) electric power for driving the vehicle in addition to the power storage device.

It is known that some hybrid vehicles have a power storage device mounted on the vehicle and chargeable from a power supply external to the vehicle, like the electric vehicles. For example, a so-called "plug-in hybrid vehicle" is known that has a power storage device chargeable from a power supply of an ordinary household by connecting a power supply outlet provided at the house and a charging inlet provided at the vehicle by means of a charging cable.

As for the way to transmit electric power, wireless power transmission without using power supply cord and power transmission cable has been of interest in recent years. Three techniques are known as predominant wireless power transmission techniques. These techniques are power transmission by means of electromagnetic induction, power transmission by means of electromagnetic wave, and power transmission by means of a resonance method.

Among them, the resonance method is a noncontact power transmission technique, with which a pair of resonators (a pair of self-resonant coils for example) is caused to resonate in an electromagnetic field (near field) and electric power is transmitted through the electromagnetic field. With the resonance method, a large amount of electric power of a few kW can be transmitted over a relatively long distance (a few meters for example) (see Non-Patent Document 1).

Patent Document 1: Japanese Patent Laying-Open No, 10-257681
Patent Document 2: Japanese Patent Laying-Open No. 2006-320079
Patent Document 3: International Patent Publication No. 2007/008646
Non-Patent Document 1: Andre Kurs et al., "Wireless Power Transfer via Strongly Coupled Magnetic Resonances" (on-line), Jul. 6, 2007, Science, Vol. 317, pp. 83-86 (searched Sep. 12, 2007), on the Internet <URL:http://www.sciencemag.org/cgi/reprint/317/5834/83.pdf>

DISCLOSURE OF THE INVENTION

Problems to be Solved by the Invention

Regarding the resonance method, as long as a resonator on the electric power transmitter side and a resonator on the electric power receiver side satisfy conditions for resonating, electric power is transmitted. In the case for example where some failure occurs to the electric power receiving system, however, it may not be desired for the electric power receiver side to receive electric power. In the case of a failure or the like, desirably the internal circuitry is protected while power feeding is immediately stopped.

In the case where the wireless power transmission technique disclosed in the above-referenced "Wireless Power Transfer via Strongly Coupled Magnetic Resonances" is applied to a power feeding system for feeding a vehicle with electric power, a challenge is in what way reception of electric power is stopped when it is unnecessary for the vehicle to receive the electric power. The document referenced above, however, does not particularly disclose specific features or control technique for stopping reception of the electric power.

An object of the present invention is to provide a noncontact power receiving apparatus and a vehicle capable of surely stopping receiving electric power that is fed by means of the resonance method.

Means for Solving the Problems

In summary, the present invention is a noncontact power receiving apparatus for receiving electric power from a power transmission coil transmitting the electric power received from a power supply. The noncontact power receiving apparatus includes: a power reception coil for receiving, by means of electromagnetic resonance, electric power transmitted from the power transmission coil; a rectifier for rectifying the electric power received by the power reception coil; a load supplied with the electric power rectified by the rectifier; and a first relay provided on a path over which the electric power is transmitted from the power reception coil to the rectifier, for cutting off the electric power.

Preferably, the noncontact power receiving apparatus further includes: a voltage conversion unit for making a voltage conversion to supply the electric power rectified by the rectifier to the load; and a second relay provided on a path over which the electric power is transmitted from the voltage conversion unit to the load, for cutting off the electric power.

More preferably, the load is a power storage device. The noncontact power receiving apparatus further includes: a first voltage detection unit for detecting a voltage on a power transmission path connecting the voltage conversion unit and the second relay; and a control unit for controlling the second relay. The control unit performs a cutoff confirming operation of causing, when the power transmission coil does not transmit electric power, the second relay to cut off the path over which the electric power is transmitted from the voltage conversion unit to the load, and determining, based on the voltage detected by the first voltage detection unit, whether the second relay is normally cut off.

Still more preferably, the noncontact power receiving apparatus further includes a communication unit for communicating with a power feeding apparatus transmitting electric power by means of the power transmission coil. After the control unit confirms, through the cutoff confirming operation, that the second relay is normally cut off, the control unit causes the first relay to be in a connecting state, and requests, by means of the communication unit, the power feeding apparatus to transmit electric power.

More preferably, the noncontact power receiving apparatus further includes: a first voltage detection unit for detecting a voltage on a power transmission path connecting the voltage conversion unit and the second relay; a second voltage detection unit for detecting a voltage on a power transmission path connecting the rectifier and the voltage conversion unit; a communication unit for communicating with a power feeding apparatus transmitting electric power by means of the power transmission coil; and a control unit for controlling the second relay. After the control unit requests, by means of the communication unit, the power feeding apparatus to stop transmitting electric power, the control unit controls the second relay to be cut off and, when the voltage detected by the second voltage detection unit becomes not more than a predetermined value, the control unit determines whether the second relay is normally cut off, based on the voltage detected by the first voltage detection unit.

Still more preferably, when the control unit determines that the second relay is normally cut off, the control unit controls the first relay to be cut off, and terminates reception of the electric power.

More preferably, when reception of the electric power is normally terminated, the control unit causes the first relay to be cut off after causing the second relay to be cut off and, when reception of the electric power is abnormally terminated due to occurrence of a failure requiring repair, the control unit causes the first relay to be cut off before causing the second relay to be cut off.

More preferably, the load is a power storage device. The noncontact power receiving apparatus further includes: a first voltage detection unit for detecting a voltage on a power transmission path connecting the voltage conversion unit and the second relay; and a control unit for controlling the second relay. The control unit performs a cutoff confirming operation of causing, when the power transmission coil does not transmit electric power, the second relay to cut off the path over which the electric power is transmitted from the voltage conversion unit to the load, and determining, based on the voltage detected by the first voltage detection unit, whether the second relay is normally cut off.

Still more preferably, the first relay includes a pair of relays connected respectively to opposite ends of the power reception coil. The noncontact power receiving apparatus further includes a communication unit for communicating with a power feeding apparatus transmitting electric power by means of the power transmission coil, and a control unit for controlling the first and second relays. After the control unit confirms, through the cutoff confirming operation, that the second relay is normally cut off, the control unit causes one of the relays of the pair to be in a connecting state and causes the other relay to be in a cutoff state, requests, by means of the communication unit, the power feeding apparatus to transmit electric power, and confirms whether the other relay of the pair is normally controlled to be in a cutoff state.

Still more preferably, the noncontact power receiving apparatus further includes a first voltage detection unit for detecting a voltage on a power transmission path connecting the voltage conversion unit and the second relay, and a second voltage detection unit for detecting a voltage on a power transmission path connecting the rectifier and the voltage conversion unit. The control unit requests the power feeding apparatus to transmit electric power and, when the voltage detected by the second voltage detection unit does not increase, the control unit determines that the other relay of the pair is normally cut off.

Still more preferably, when the control unit determines that the other relay of the pair is normally cut off, the control unit requests the power feeding apparatus to temporarily stop transmitting electric power, controls the one relay of the pair to be in a cutoff state and controls the other relay of the pair to be in a connecting state, requests again the power feeding apparatus to transmit electric power, and confirms whether the one relay of the pair is normally cut off.

Still more preferably, after the control unit confirms that both of the other relay and the one relay of the pair can be normally cut off, the control unit controls both of the first relay and the second relay to be in a connecting state, requests the power feeding apparatus to transmit electric power, and causes the load to be supplied with the electric power.

The present invention in another aspect is a vehicle including a noncontact power receiving apparatus for receiving electric power from a power transmission coil transmitting the electric power received from a power supply. The noncontact power receiving apparatus includes: a power reception coil for receiving, by means of electromagnetic resonance, electric power transmitted from the power transmission coil; a rectifier for rectifying the electric power received by the power reception coil; a load supplied with the electric power rectified by the rectifier; and a first relay provided on a path over which the electric power is transmitted from the power reception coil to the rectifier, for cutting off the electric power.

Preferably, the noncontact power receiving apparatus further includes: a voltage conversion unit for making a voltage conversion to supply the electric power rectified by the rectifier to the load; and a second relay provided on a path over which the electric power is transmitted from the voltage conversion unit to the load, for cutting off the electric power.

Effects of the Invention

The present invention can surely stop reception of electric power fed by means of the resonance method. Another effect is that diagnoses can be appropriately conducted for various types of relays.

Figure 1:
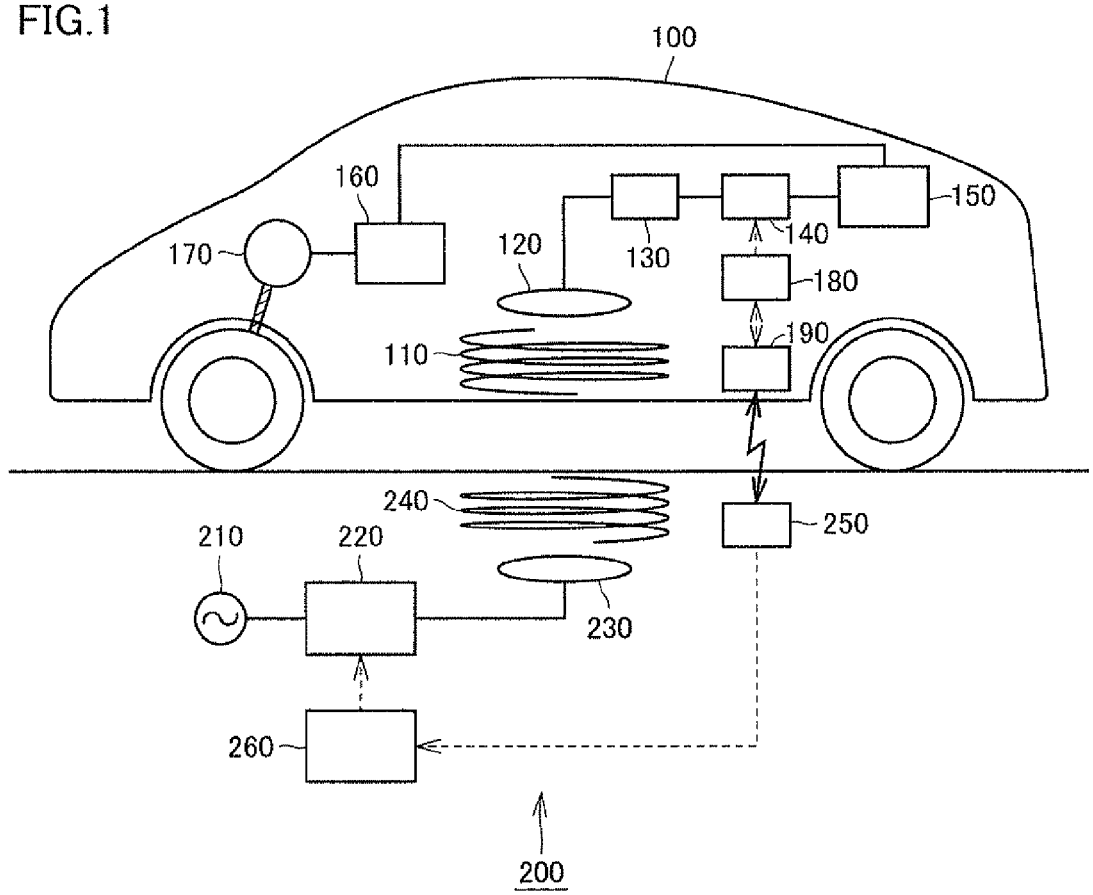
FIG. 1 is an entire configuration diagram of a power feeding system according to a first embodiment of the present invention.

DESCRIPTION OF THE REFERENCE SIGNS 100 electrically-powered vehicle; 110, 340 secondary self-resonant coil; 112, 112B, 112G relay; 120, 350 secondary coil; 130 rectifier; 140 converter; 142 DC to AC conversion unit; 144 transformation unit; 146 rectification unit; 150 power storage device; 162 voltage step-up converter; 164, 166 inverter; 170 motor; 172, 174 motor generator; 176 engine; 177 power split device; 178 drive wheel; 190 communication device; 191, 192 voltage sensor; 194 current sensor; 200 power feeding apparatus; 210 AC power supply; 220 high-frequency electric power driver; 230, 320 primary coil; 240, 330 primary self-resonant coil; 250 communication device; 310 high-frequency power supply; 360 load; 180 vehicle ECU; PL2 positive line; SMR1, SMR2 system main relay.

BEST MODES FOR CARRYING OUT THE INVENTION

Embodiments of the present invention will hereinafter be described in detail with reference to the drawings. In the drawings, the same or corresponding components are denoted by the same reference characters, and a description thereof will not be repeated.

First Embodiment

FIG. 1 is an entire configuration diagram of a power feeding system according to a first embodiment of the present invention. Referring to FIG. 1, the power feeding system includes an electrically-powered vehicle 100 and a power feeding apparatus 200. Electrically-powered vehicle 100 includes a secondary self-resonant coil 110, a secondary coil 120, a rectifier 130, a DC/DC converter 140, and a power storage device 150. Electrically-powered vehicle 100 further includes a power control unit (hereinafter also referred to as "PCU") 160, a motor 170, a vehicle ECU (Electronic Control Unit) 180, and a communication device 190.

Secondary self-resonant coil 110 is placed in a lower portion of the vehicle body. Secondary self-resonant coil 110 may be placed in an upper portion of the vehicle body if power feeding apparatus 200 is arranged above the vehicle. Secondary self-resonant coil 110 is an LC resonant coil with the two opposite ends opened (non-connected), and receives electric power from power feeding apparatus 200 by resonating through an electromagnetic field with a primary self-resonant coil 240 (described later) of power feeding apparatus 200. The capacitance component of secondary self-resonant coil 110 is a stray capacitance of the coil. Instead, a capacitor connected to the two opposite ends of the coil may be provided.

The number of turns of secondary self-resonant coil 110 is appropriately set based on, for example, the distance between the secondary self-resonant coil and primary self-resonant coil 240 of power feeding apparatus 200, and the resonance frequency of primary self-resonant coil 240 and secondary self-resonant coils 110, so that a Q factor representing the intensity of resonance of primary self-resonant coil 240 and secondary self-resonant coil 110 (Q>100 for example) and κ is representing the degree of coupling of the coils, for example, are large.

Secondary coil 120 is disposed coaxially with secondary self-resonant coil 110 and can be magnetically coupled to secondary self-resonant coil 110 through electromagnetic induction. Secondary coil 120 picks up, through electromagnetic induction, the electric power received by secondary self-resonant coil 110, and outputs the electric power to rectifier 130. Rectifier 130 rectifies the AC electric power picked up by secondary coil 120.

DC/DC converter 140 converts the electric power rectified by rectifier 130 into a voltage level of power storage device 150 based on a control signal from vehicle ECU 180, and outputs the resultant electric power to power storage device 150. In the case where the vehicle receives electric power from power feeding apparatus 200 while the vehicle is traveling (in this case, power feeding apparatus 200 may be arranged above or on a side for example of the vehicle), DC/DC converter 140 may convert the electric power rectified by rectifier 130 into a system voltage and directly supply the system voltage to PCU 160. Here, DC/DC converter 140 is not necessarily be required. Specifically, after the AC electric power picked up by secondary coil 120 is rectified by rectifier 130, the electric power may be directly provided to power storage device 150.

Power storage device 150 is a rechargeable DC power supply, and includes a secondary battery such as lithium-ion battery or nickel-metal hydride battery, for example. Power storage device 150 stores electric power supplied from DC/DC converter 140 and also stores regenerative electric power generated by motor 170. Power storage device 150 supplies the stored electric power to PCU 160. As power storage device 150, a capacitor of large capacitance may be employed. The power storage device may be any as long as the power storage device is an electric power buffer capable of temporarily storing the electric power supplied from power feeding apparatus 200 and the regenerative electric power from motor 170, and supplying the stored electric power to PCU 160.

PCU 160 drives motor 170 using electric power that is output from power storage device 150 or electric power directly supplied from DC/DC converter 140. PCU 160 also rectifies regenerative electric power generated by motor 170, and outputs the rectified electric power to power storage device 150 to charge power storage device 150. Motor 170 is driven by PCU 160 to generate driving force for the vehicle and output the driving force to drive wheels, Motor 170 also generates electric power from kinetic energy received from the drive wheels or engine (not shown), and outputs the generated regenerative electric power to PCU 160.

Vehicle ECU 180 controls PCU 160 based on the traveling condition of the vehicle and the state of charge (hereinafter also referred to as "SOC") of power storage device 150. Communication device 190 is a communication interface for performing wireless communication with power feeding apparatus 200 located outside the vehicle.

Power feeding apparatus 200 includes an AC power supply 210, a high frequency electric power driver 220, a primary coil 230, primary self-resonant coil 240, a communication device 250, and an ECU 260.

AC power supply 210 is a power supply located externally to the vehicle, and is a commercial power supply for example. High-frequency electric power driver 220 converts electric power received from AC power supply 210 into high-frequency electric power, and supplies the resultant high-frequency electric power to primary coil 230. The frequency of the high-frequency electric power generated by high-frequency electric power driver 220 is 1 MHz to tens of MHz for example.

Primary coil 230 is disposed coaxially with primary self-resonant coil 240, and can be magnetically coupled to primary self-resonant coil 240 through electromagnetic induction. The high-frequency electric power supplied from high-frequency electric power driver 220 is fed from primary coil 230 to primary self-resonant coil 240 through electromagnetic induction.

Primary self-resonant coil 240 is disposed near the ground. In the case where electric power is fed to electrically-powered vehicle 100 from above the vehicle, the primary self-resonant coil may be disposed above or on a side of the vehicle. Primary self-resonant coil 240 is also an LC resonant coil with the two opposite ends opened (non-connected), and resonates through an electromagnetic field with secondary self-resonant coil 110 of electrically-powered vehicle 100, and thereby transmits electric power to electrically-powered vehicle 100. The capacitance component of primary self-resonant coil 240 is also the stray capacitance of the coil. Instead, a capacitor connected to the two opposite ends of the coil may be provided.

The number of turns of this primary self-resonant coil 240 is also appropriately set based on, for example, the distance between the primary self-resonant coil and secondary self-resonant coil 110 of electrically-powered vehicle 100 and the resonance frequency of primary self-resonant coil 240 and secondary self-resonant coil 110, so that a Q factor (Q>100 for example) and degree of coupling κ for example are large.

Communication device 250 is a communication interface for performing wireless communication with electrically-powered vehicle 100 to which electric power is to be fed. ECU 260 controls high-frequency electric power driver 220 so that the electric power received by electrically-powered vehicle 100 is equal to a target value. Specifically, ECU 260 obtains the value of electric power received by electrically-powered vehicle 100 as well as a target value of the electric power from electrically-powered vehicle 100 by means of communication device 250, and controls the output of high-frequency electric power driver 220 so that the electric power received by electrically-powered vehicle 100 is equal to the target value. ECU 260 can transmit the impedance value of power feeding apparatus 200 to electrically-powered vehicle 100.

Figure 2:
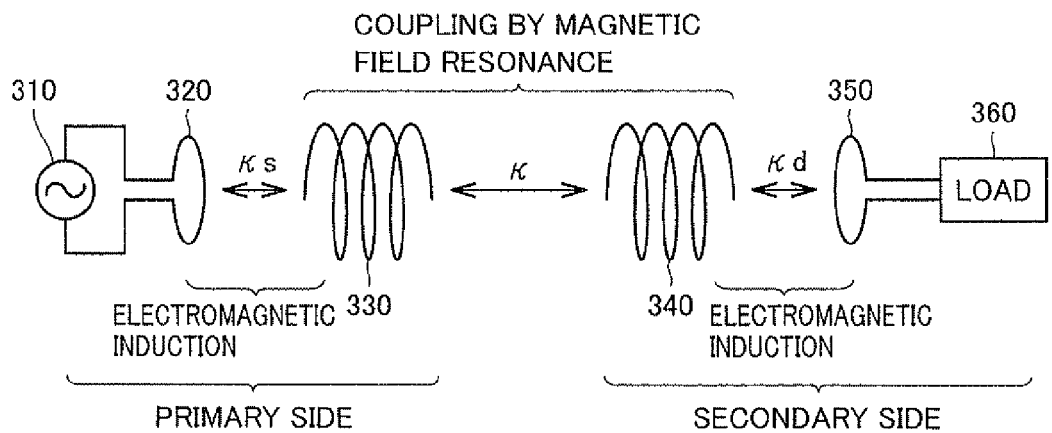
FIG. 2 is a diagram for illustrating a principle of electric power transmission by means of the resonance method.

FIG. 2 is a diagram for illustrating a principle of electric power transmission by means of the resonance method. Referring to FIG. 2, according to this resonance method, two LC resonant coils having the same natural frequency resonate in an electromagnetic field (near field) like two resonating tuning forks, and accordingly electric power is transmitted through the electromagnetic field from one coil to the other coil.

Specifically, a primary coil 320 is connected to a high-frequency power supply 310, and high-frequency electric power of 1 MHz to tens of MHz is fed to a primary self-resonant coil 330 magnetically coupled to primary coil 320 by electromagnetic induction. Primary self-resonant coil 330 is an LC resonator with the inductance and stray capacitance of the coil itself, and resonates with a secondary self-resonant coil 340 having the same resonance frequency as primary self-resonant coil 330 through an electromagnetic field (near field), Then, energy (electric power) is transferred from primary self-resonant coil 330 to secondary self-resonant coil 340 through the electromagnetic field. The energy (electric power) transferred to secondary self-resonant coil 340 is picked up by a secondary coil 350 that is magnetically coupled to secondary self-resonant coil 340 by electromagnetic induction, and supplied to a load 360. Electric power transmission by means of the resonance method is accomplished when a Q factor representing the intensity of resonance of primary self-resonant coil 330 and secondary self-resonant coil 340 is larger than for example 100.

As to the correspondence to FIG. 1, AC power supply 210 and high-frequency electric power driver 220 in FIG. 1 correspond to high-frequency power supply 310 in FIG. 2. Primary coil 230 and primary self-resonant coil 240 in FIG. 1 correspond respectively to primary coil 320 and primary self-resonant coil 330 in FIG. 2, and secondary self-resonant coil 110 and secondary coil 120 in FIG. 1 correspond respectively to secondary self-resonant coil 340 and secondary coil 350 in FIG. 2. Rectifier 130 and the subsequent components in FIG. 1 are collectively represented by load 360.

Figure 3:
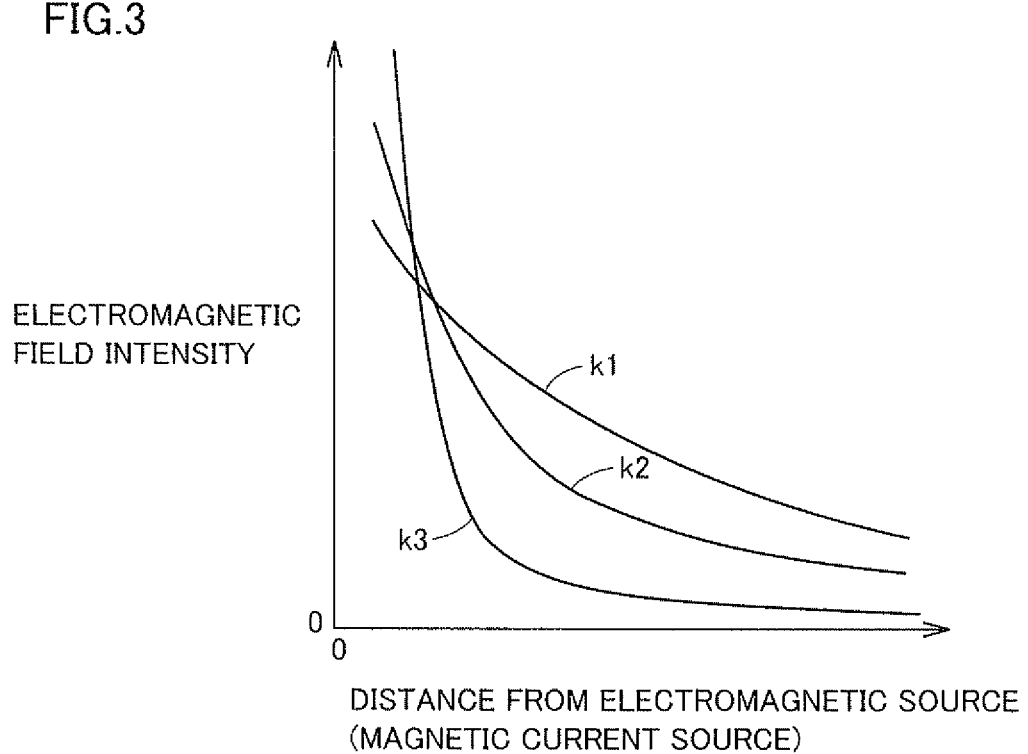
FIG. 3 is a diagram showing a relation between the distance from an electric current source (magnetic current source) and the intensity of an electromagnetic field.

FIG. 3 is a diagram showing a relation between the distance from an electric current source (magnetic current source) and the intensity of an electromagnetic field. Referring to FIG. 3, the electromagnetic field includes three components. Curve k1 represents a component inversely proportional to the distance from a wave source, and is referred to as "radiation electromagnetic field". Curve k2 represents a component inversely proportional to the square of the distance from the wave source, and is referred to as "induction electromagnetic field". Curve k3 represents a component inversely proportional to the cube of the distance from the wave source, and is referred to as "electrostatic field".

"Electrostatic field" is a region where the intensity of the electromagnetic wave sharply decreases with respect to the distance from the wave source. The resonance method uses a near field (evanescent field) where this "electrostatic field" is dominant to transfer energy (electric power). More specifically, in the near field where "electrostatic field" is dominant, a pair of resonators (for example a pair of LC resonant coils) having the same natural frequency is caused to resonate and thereby transfer energy (electric power) from one resonator (primary self-resonant coil) to the other resonator (secondary self-resonant coil). This "electrostatic field" does not propagate energy to a distant location. Therefore, as compared with an electromagnetic wave transferring energy (electric power) by "radiation electromagnetic field" propagating energy to a distant location, the resonance method can transmit electric power with a smaller energy loss.

Figure 4:
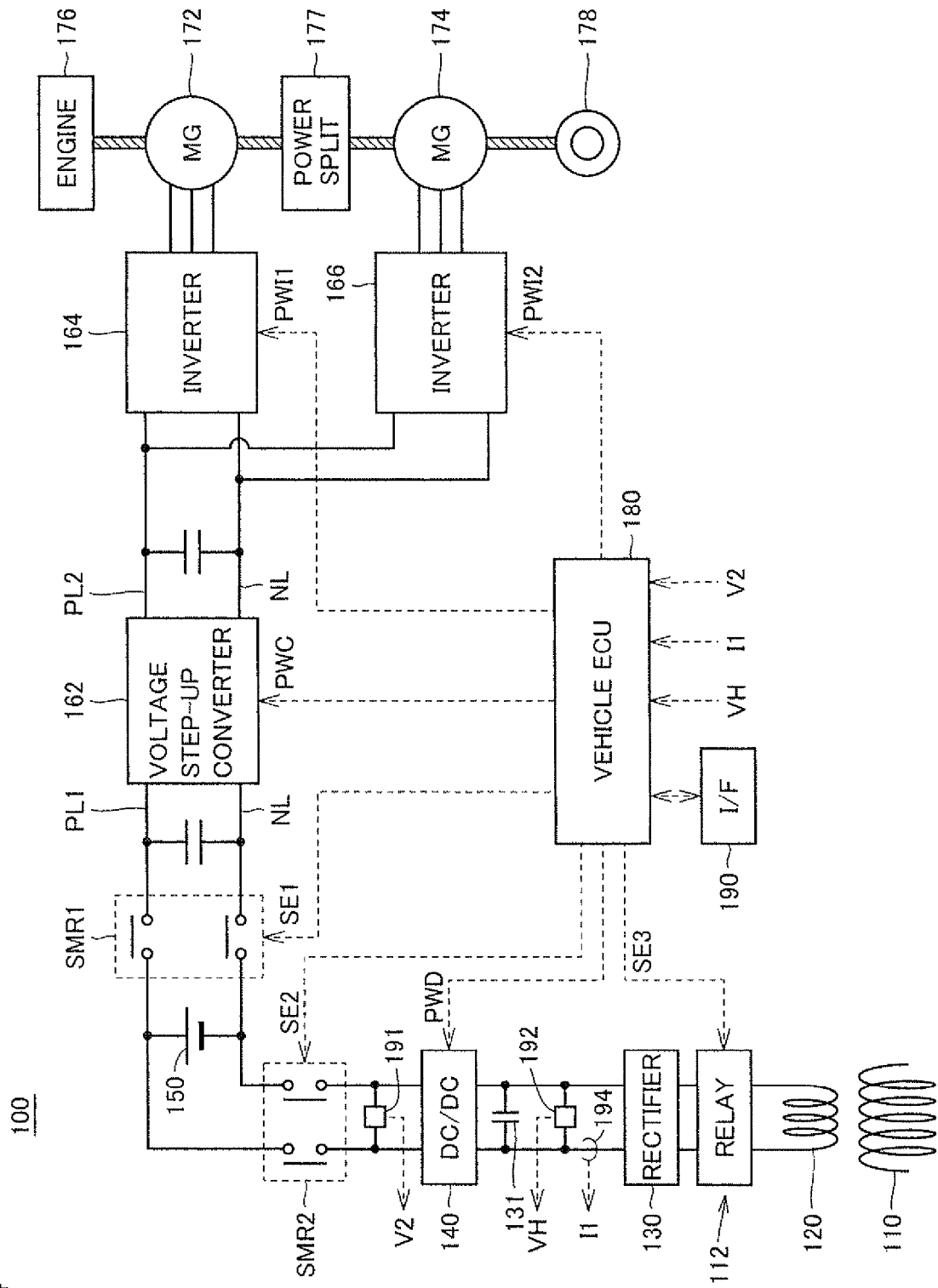
FIG. 4 is a block diagram showing a power train configuration of an electrically-powered vehicle 100 shown in FIG. 1.

FIG. 4 is a block diagram showing a power train configuration of electrically-powered vehicle 100 shown in FIG. 1. Referring to FIG. 4, electrically-powered vehicle 100 includes a power storage device 150, a system main relay SWIRL a voltage step-up converter 162, inverters 164, 166, motor generators 172, 174, an engine 176, a power split device 177, and a drive wheel 178. Electrically-powered vehicle 100 also includes secondary self-resonant coil 110, secondary coil 120, rectifier 130, DC/DC converter 140, a system main relay SMR2, vehicle ECU 180, communication device 190, voltage sensors 191, 192, and a current sensor 194.

This electrically-powered vehicle 100 is mounted with engine 176 and motor generator 174 each used as a source of motive power. Engine 176 and motor generators 172, 174 are coupled to power split device 177. Electrically-powered vehicle 100 travels using the driving force generated by at least one of engine 176 and motor generator 174. The motive power generated by engine 176 is split into two components by power split device 177. Specifically, one is transmitted through a path leading to drive wheel 178 and the other is transmitted through a path leading to motor generator 172.

Motor generator 172 is an AC rotating electric machine and includes, for example, a three-phase AC synchronous electric motor having permanent magnets embedded in a rotor. Motor generator 172 generates electric power using kinetic energy of engine 176 that has been split by power split device 177.

For example, when the SOC of power storage device 150 becomes lower than a predetermined value, engine 176 starts and motor generator 172 generates electric power. Thus, power storage device 150 is charged.

Motor generator 174 is also an AC rotating electric machine and, like motor generator 172, includes, for example, a three-phase AC synchronous electric motor having permanent magnets embedded in a rotor. Motor generator 174 uses at least one of the electric power stored in power storage device 150 and the electric power generated by motor generator 172 to generate driving force. The driving force of motor generator 174 is transmitted to drive wheel 178.

When the vehicle's brake is applied or when acceleration is slowed down while the vehicle is traveling downhill, the kinetic energy or the mechanical energy stored in the vehicle in the form of potential energy is used through drive wheel 178 for rotationally driving motor generator 174, and accordingly motor generator 174 operates as an electric generator. Motor generator 174 thus operates as a regenerative brake converting the traveling energy into electric power and generating braking force. The electric power generated by motor generator 174 is stored in power storage device 150. Here, motor generator 174 corresponds to motor 170 in FIG. 1.

Power split device 177 includes a planetary gear train having a sun gear, a pinion gear, a carrier, and a ring gear. The pinion gear engages with the sun gear and the ring gear. The carrier supports the pinion gear so that the pinion gear can rotate about its axis, and is coupled to a crankshaft of engine 176. The sun gear is coupled to the rotational shaft of motor generator 172. The ring gear is coupled to the rotational shaft of motor generator 174 and drive wheel 178.

System main relay SMR1 is disposed between power storage device 150 and voltage step-up converter 162. When signal SE1 from vehicle ECU 180 is activated, system main relay SMR1 electrically connects power storage device 150 and voltage step-up converter 162. When signal SE1 is deactivated, system main relay SMR1 cuts off the electrical path between power storage device 150 and voltage step-up converter 162.

Based on signal PWC from vehicle ECU 180, voltage step-up converter 162 steps up the voltage that is output from power storage device 150, and outputs the stepped-up voltage to a positive line PL2. Voltage step-up converter 162 includes a DC chopper circuit for example.

Inverters 164, 166 are provided in association with motor generators 172, 174, respectively. Inverter 164 drives motor generator 172 based on signal PWI1 from vehicle ECU 180, and inverter 166 drives motor generator 174 based on signal PWI2 from vehicle ECU 180, Inverters 164, 166 each include a three-phase bridge circuit for example.

Here, voltage step-up converter 162 and inverters 164, 166 correspond to PCU 160 in FIG. 1.

The impedance of secondary self-resonant coil 110 is adjusted to an impedance that allows secondary self-resonant coil 110 to resonate with primary self-resonant coil 240 in FIG. 1. Secondary coil 120 which receives electric power via secondary self-resonant coil 110 is connected by a relay 112 to rectifier 130. Turning on and turning off of relay 112 are controlled based on control signal SE3 transmitted from vehicle ECU 180. As secondary coil 120, rectifier 130, and DC/DC converter 140 have been described above with reference to FIG. 1, the description will not be repeated.

System main relay SMR2 is disposed between DC/DC converter 140 and power storage device 150. When signal SE2 from vehicle ECU 180 is activated, system main relay SMR2 electrically connects power storage device 150 to DC/DC converter 140. When signal SE2 is deactivated, system main relay SMR2 cuts off the electrical path between power storage device 150 and DC/DC converter 140.

Voltage sensor 191 detects voltage V2 between the lines of a power transmission path between system main relay SMR2 and DC/DC converter 140, and outputs the detected value to vehicle ECU 180. Voltage sensor 192 detects voltage VH between the lines of a power transmission path between rectifier 130 and DC/DC converter 140, and outputs the detected value to vehicle ECU 180. Current sensor 194 detects current I1 that is output from rectifier 130, and outputs the detected value to vehicle ECU 180.

Based on the degree to which the accelerator is pressed down, the vehicles speed, and respective signals from sensors, vehicle ECU 180 generates signals PWC, PWI1, PWI2 for driving voltage step-up converter 162 and motor generators 172, 174 respectively, and outputs generated signals PWC, PWI1, PWI2 to voltage step-up converter 162 and inverters 164, 166, respectively.

While the vehicle is traveling, vehicle ECU 180 activates signal SE1 to turn on system main relay SMR1 and deactivates signal SE2 to turn off system main relay SMR2. In the case where the vehicle can receive electric power from the power feeding apparatus while the vehicle is traveling, vehicle ECU 180 may activate signals SE1, SE2 to turn on both of system main relays SMR1, SMR2.

In contrast, when the vehicle is to receive electric power from power feeding apparatus 200 located outside the vehicle, vehicle ECU 180 deactivates signal SE1 to turn off system main relay SMR1 and activates signal SE2 to turn on system main relay SMR2.

Vehicle ECU 180 generates signal PWD for controlling DC/DC converter 140, and outputs the generated signal PWD to DC/DC converter 140. Further, based on voltage VH from voltage sensor 192 and current I1 from current sensor 194, vehicle ECU 180 calculates the electric power received from power feeding apparatus 200, and transmits the calculated value together with a target value of the received electric power to power feeding apparatus 200 by means of communication device 190.

Figure 5:
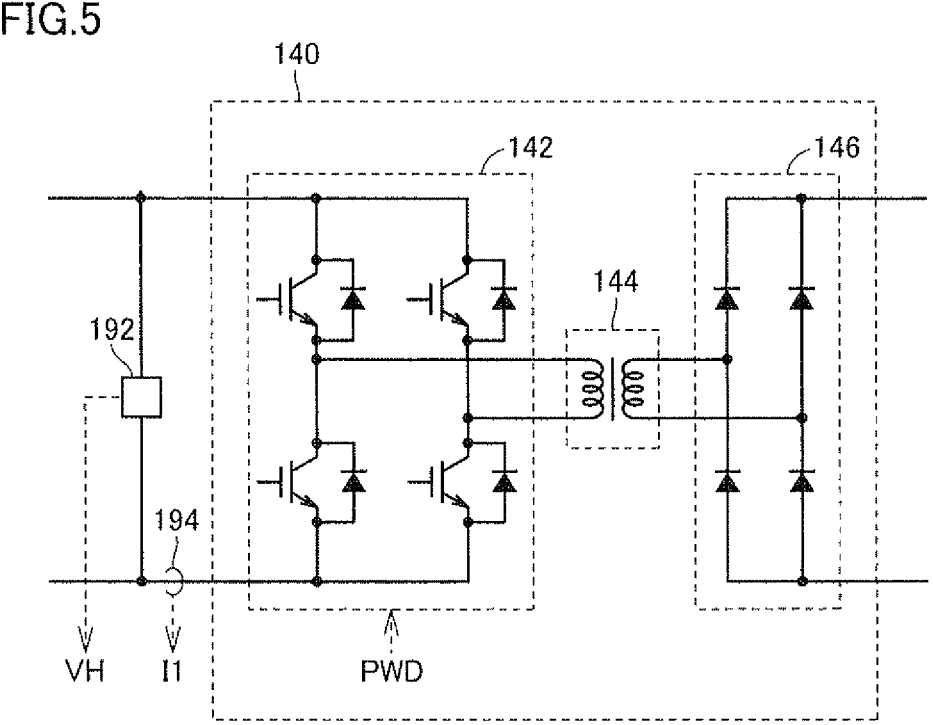
FIG. 5 is a circuit diagram of a DC/DC converter 140 shown in FIG. 4.

FIG. 5 is a circuit diagram of DC/DC converter 140 shown in FIG. 4.

Referring to FIG. 5, DC/DC converter 140 includes a DC to AC conversion unit 142, a transformation unit 144, and a rectification unit 146. DC to AC conversion unit 142 includes switching devices driven to be ON or OFF based on signal PWD from vehicle ECU 180, converts DC power supplied from rectifier 130 in FIG. 4 into AC power, and outputs the AC power to transformation unit 144.

Transformation unit 144 electrically insulates DC to AC conversion unit 142 and rectification unit 146 from each other, and makes a voltage conversion in accordance with the coil turn ratio. Rectification unit 146 rectifies the AC power that is output from transformation unit 144 into DC power, and outputs the DC power to power storage device 150 in FIG. 4.

Figure 6:
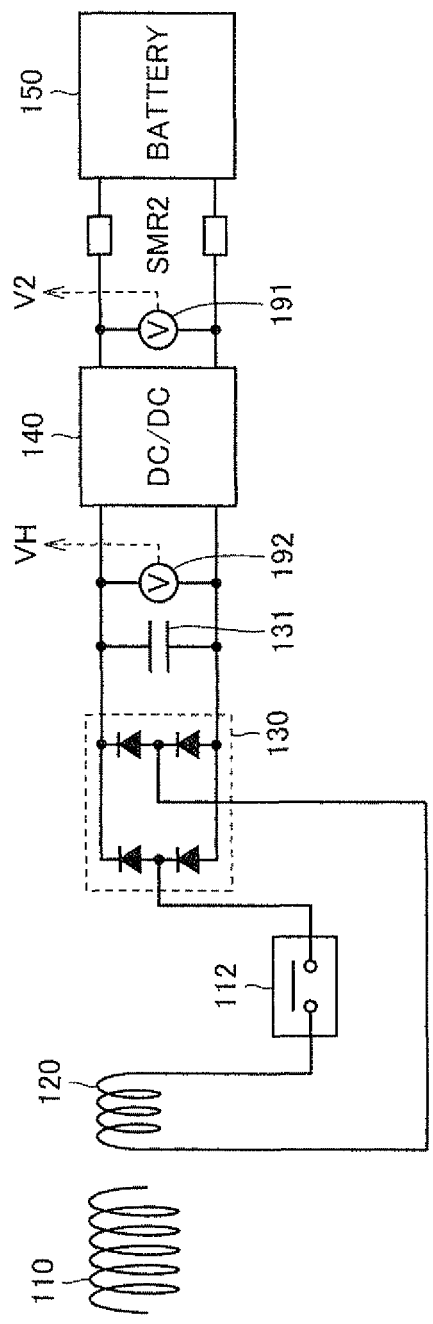
FIG. 6 is a circuit diagram for illustrating arrangement of relays in a first embodiment.

FIG. 6 is a circuit diagram for illustrating arrangement of relays in the first embodiment.

Referring to FIG. 6, secondary coil 120 for receiving electric power is placed in the vicinity of secondary self-resonant coil 110 to be resonated. One end of secondary coil 120 is connected to rectifier 130 via relay 112, and the other end of the power receiving coil is directly connected to rectifier 130. Rectifier 130 is configured for example with a diode bridge. The voltage rectified by rectifier 130 is smoothed by a smoothing capacitor. The smoothed voltage is detected as voltage VH by voltage sensor 192, Voltage Vii is provided to DC/DC converter 140 operating as a charger.

DC/DC converter 140 converts the voltage provided from the rectifier into a voltage appropriate for charging power storage device 150. Between DC/DC converter 140 and power storage device 150, system main relay SMR2 is provided.

Vehicle 100 in the present embodiment may be described as being mounted with a noncontact power receiving apparatus. The noncontact power receiving apparatus receives electric power from a power transmission coil (primary self-resonant coil 240 in FIG. 1) transmitting the electric power received from a power supply. The noncontact power receiving apparatus includes: a power reception coil (secondary self-resonant coil 110 and secondary coil 120) for receiving, by means of electromagnetic resonance, electric power transmitted from the power transmission coil; rectifier 130 for rectifying the electric power received by the power reception coil; a load such as power storage device 150 supplied with the electric power rectified by rectifier 130; and relay 112 provided on a path over which the electric power is transmitted from the power reception coil to the rectifier, for cutting off the electric power.

Preferably, the noncontact power receiving apparatus further includes: DC/DC converter 140 for making a voltage conversion to supply the electric power rectified by rectifier 130 to the load (150); and system main relay SMR2 provided on a path over which the electric power is transmitted from DC/DC converter 140 to the load (150), for cutting off the electric power.

More preferably, the load (150) is power storage device 150. The noncontact power receiving apparatus further includes: first voltage sensor 191 for detecting voltage V2 on a power transmission path connecting DC/DC converter 140 and system main relay SMR2; and vehicle ECU 180 for controlling system main relay SMR2. Vehicle ECU 180 performs a cutoff confirming operation of causing, when the power transmission coil (240) does not transmit electric power, system main relay SMR2 to cut off the path over which the electric power is transmitted from DC/DC converter 140 to the load (150), and determining, based on the voltage detected by first voltage sensor 191, whether system main relay SMR2 is normally cut off.

Still more preferably, the noncontact power receiving apparatus further includes communication device 190 for communicating with power feeding apparatus 200 transmitting electric power by means of the power transmission coil (240). After vehicle ECU 180 confirms, through the cutoff confirming operation, that system main relay SMR2 is normally cut off, vehicle ECU 180 causes relay 112 to be in a connecting state, and requests, by means of communication device 190, power feeding apparatus 200 to transmit electric power.

More preferably, the noncontact power receiving apparatus further includes: first voltage sensor 191 for detecting voltage V2 on a power transmission path connecting DC/DC converter 140 and system main relay SMR2; second voltage sensor 192 for detecting voltage VH on a power transmission path connecting rectifier 130 and DC/DC converter 140; communication device 190 for communicating with power feeding apparatus 200 transmitting electric power by means of the power transmission coil (240); and vehicle ECU 180 for controlling system main relay SMR2. After vehicle ECU 180 requests, by means of communication device 190, power feeding apparatus 200 to stop transmitting electric power, vehicle ECU 180 controls system main relay SMR2 to be cut off and, when the voltage detected by second voltage sensor 192 becomes not more than a predetermined value, vehicle ECU 180 determines whether system main relay SMR2 is normally cut off, based on the voltage detected by first voltage sensor 191.

Still more preferably, when vehicle ECU 180 determines that system main relay SMR2 is normally cut off, vehicle ECU 180 controls relay 112 to be cut off, and terminates reception of the electric power.

More preferably, the noncontact power receiving apparatus further includes vehicle ECU 180 for controlling relay 112 and system main relay SMR2. When reception of the electric power is normally terminated, vehicle ECU 180 causes relay 112 to be cut off after causing system main relay SMR2 to be cut off and, when reception of the electric power is abnormally terminated due to occurrence of a failure requiring repair, vehicle ECU 180 causes relay 112 to be cut off before causing system main relay SMR2 to be cut off.

More preferably, the load (150) is a power storage device. The noncontact power receiving apparatus further includes: first voltage sensor 191 for detecting voltage V2 on a power transmission path connecting DC/DC converter 140 and system main relay SMR2; and vehicle ECU 180 for controlling system main relay SMR2. Vehicle ECU 180 performs a cutoff confirming operation of causing, when the power transmission coil (240) does not transmit electric power, system main relay SMR2 to cut off the path over which the electric power is transmitted from DC/DC converter 140 to the load (150), and determining, based on the voltage detected by first voltage sensor 191, whether system main relay SMR2 is normally cut off.

A process followed for starting reception of electric power and a process followed for terminating reception thereof as described above will hereinafter be described in detail by means of flowcharts.

Figure 7:
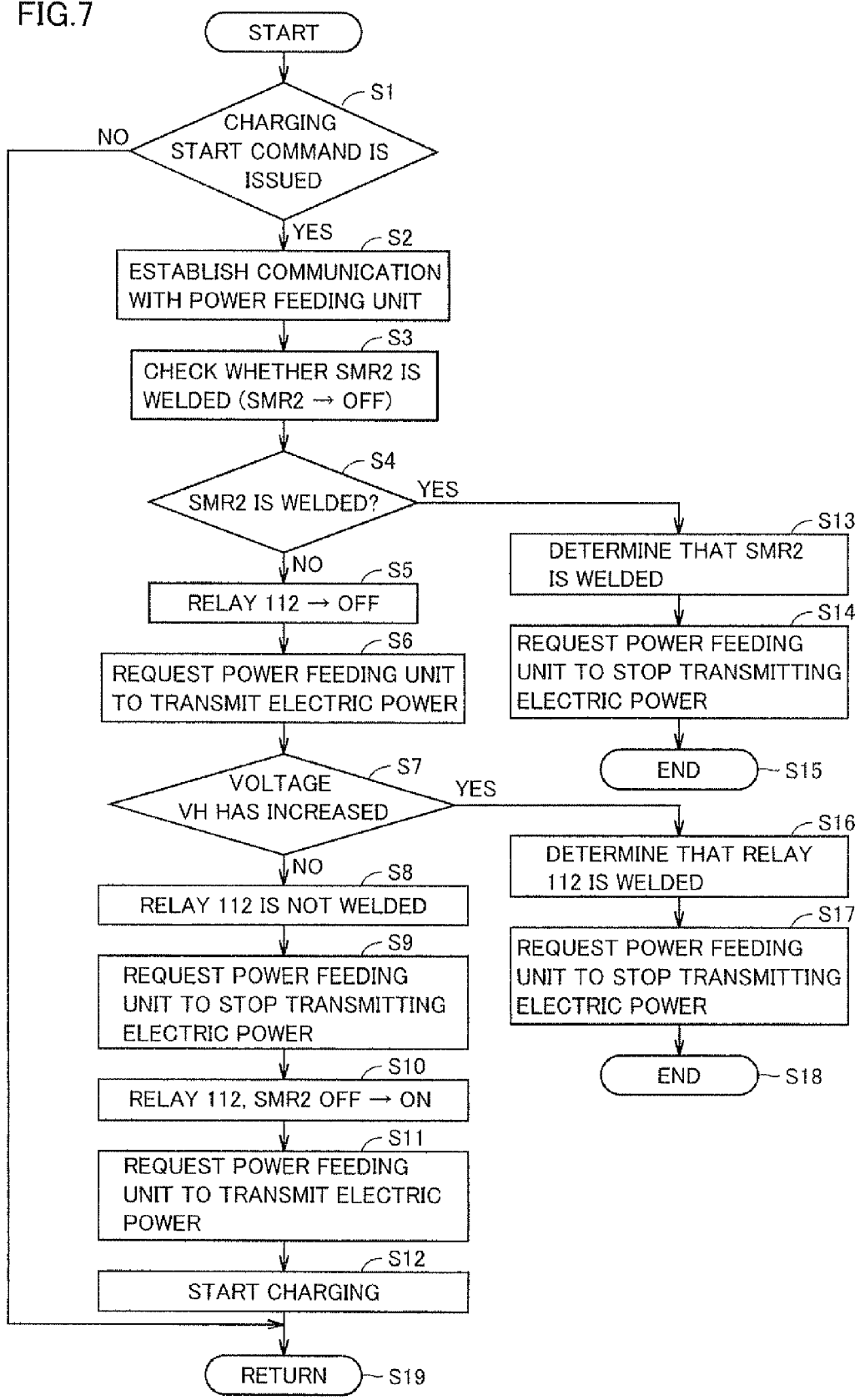
FIG. 7 is a flowchart for illustrating a charging start process executed by a vehicle ECU 180.

FIG. 7 is a flowchart for illustrating a charging start process executed by vehicle ECU 180. The process of the flowchart is called from a predetermined main routine and executed.

Referring to FIG. 7, in step S1, it is determined first whether or not a charging start command has been issued. The charging start command is issued, for example, in response to pressing of a charging start button by a person in the vehicle. When the charging start command has been given in step S1, the process proceeds to step S2. When the charging start command has not been issued in step S1, the control is returned to the main routine in step S19.

When the process proceeds to step S2, vehicle ECU 180 uses communication device 190 in FIG. 1 to establish communication with power feeding apparatus 200. In step S3, a welding check for system main relay SMR2 is conducted.

When system main relay SMR2 is made OFF, power storage device 150 is disconnected. Then, voltage V2 detected by voltage sensor 191 in FIG. 4 should decrease. When system main relay SMR2 is controlled to be OFF and it is confirmed that voltage V2 decreases to be smaller than a predetermined threshold which is set smaller than the voltage of power storage device 150, it is seen that system main relay SMR2 has been normally rendered OFF, namely has not been welded. A determination about the result of the welding check in step S3 is made in step S4.

When it is determined in step S4 that SMR2 has been welded, the process proceeds to step S13 in which the result of the determination that SMR2 has been welded is confirmed, stored, or an alarm is issued. In step S14, vehicle ECU 180 makes a request via communication device 190 to power feeding apparatus 200 to stop transmitting electric power. In step S15, the process is ended.

When it is determined in step S4 that SMR2 has not been welded, the process proceeds to step S5. In step S5, vehicle ECU 180 controls relay 112 provided between secondary coil 120 and rectifier 130 so that relay 112 is rendered OFF. In step S6, vehicle ECU 180 makes a request via communication device 190 to power feeding apparatus 200 to transmit electric power.

When electric power is transmitted from power feeding apparatus 200, primary self-resonant coil 240 is controlled with the resonance frequency. If relay 112 is welded, the electric power received by secondary self-resonant coil 110 by means of the resonance is provided via secondary coil 120 to rectifier 130. Then, the electric power is transmitted to cause voltage VH to increase. In contrast, if relay 112 is normally cut off, the electric power is not input to rectifier 130 and thus voltage VH should not increase.

Therefore, whether or not relay 112 has been welded is determined by checking in step S7 whether voltage VH has increased. When an increase of voltage VH is detected in step S7, the process proceeds to step S16. In step S16, the result of the determination that relay 112 has been welded is confirmed, stored, or an alarm is issued. In step S17, vehicle ECU 180 makes a request via communication device 190 to power feeding apparatus 200 to stop transmitting electric power. Then, in step S18, the process is ended.

In contrast, when an increase of voltage VH is not detected in step S7, the process proceeds to step S8. In step S8, it is determined that relay 112 has been normally rendered OFF and thus has not been welded. In step S9, vehicle ECU 180 makes a request via communication device 190 to power feeding apparatus 200 to temporarily stop transmitting electric power. In step S10, vehicle ECU 180 controls relay 112 and system main relay SMR2 that have been rendered OFF, so that both of the relays are rendered ON. In subsequent step S11, vehicle ECU 180 makes a request via communication device 190 to power feeding apparatus 200 to transmit electric power. In step S12, a charging process is started. After this, in step S19, the control is returned to the main routine.

Figure 8:
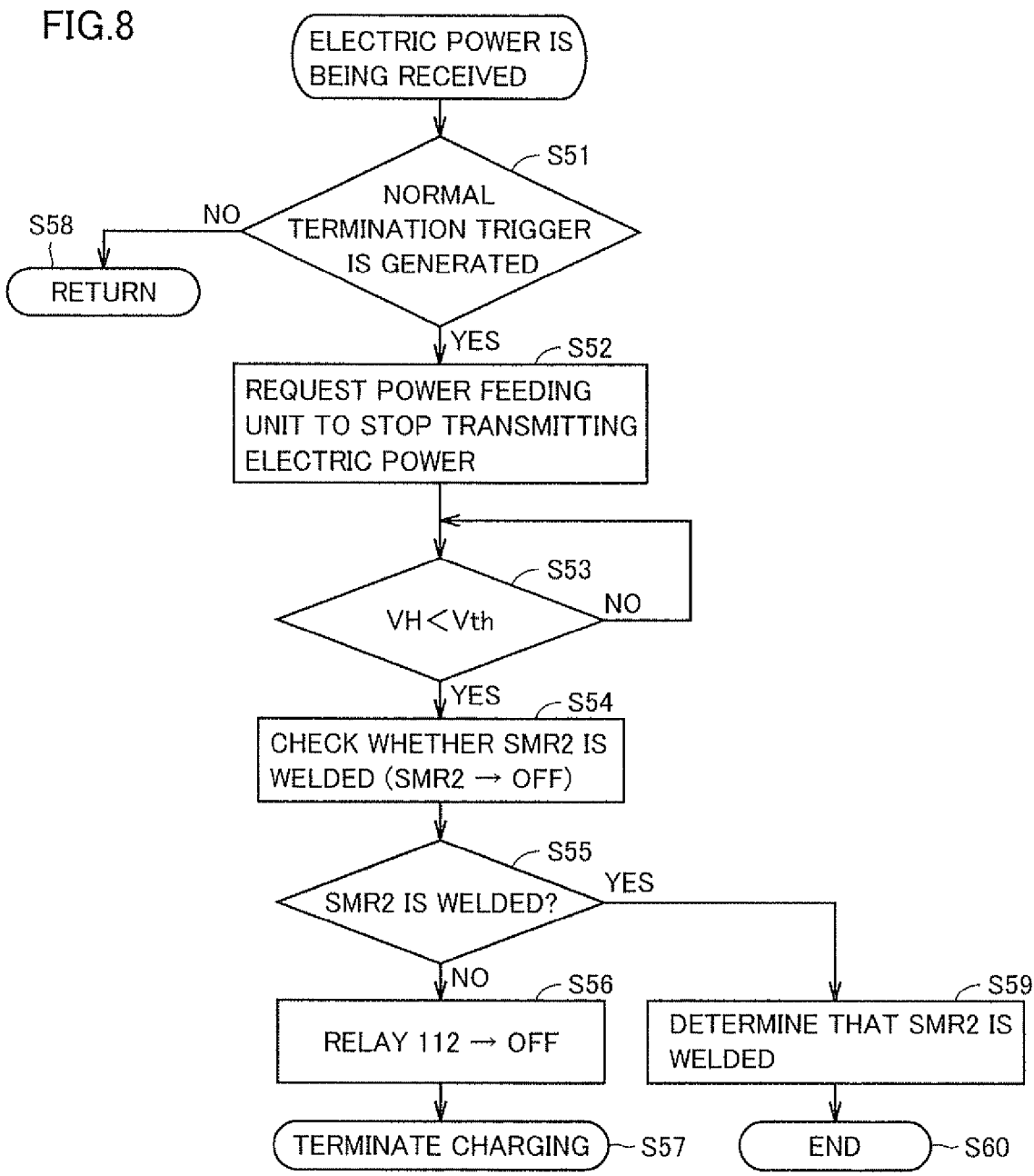
FIG. 8 is a flowchart illustrating a process followed in the case where ongoing reception of electric power is normally terminated.

FIG. 8 is a flowchart illustrating a process followed in the case where ongoing reception of electric power is normally terminated.

Referring to FIG. 8, while the noncontact power receiving apparatus of the vehicle is receiving electric power, whether or not a normal termination trigger is generated is monitored in step S51. The normal termination trigger is generated, for example, in the case where power storage device 150 has been charged to the extent that the state of charge (SOC) is equal to the management value of the upper limit (the value representing full charge), in the case where a charging termination button is pressed, or in the case where the battery temperature or battery voltage is out of a predetermined range appropriate for charging.

When such a normal termination trigger is not generated, the process proceeds to step S58, and the control temporarily follows the main routine. In this case, the condition for receiving electric power is satisfied and secondary self-resonant coil 110 is controlled so that the coil can receive electric power. Then, after a predetermined time has elapsed, for example, step S51 is performed again.

In step S51, when generation of the normal termination trigger is confirmed, the process proceeds to step S52. In step S52, vehicle ECU 180 makes a request via communication device 190 to power feeding apparatus 200 to stop transmitting electric power. Accordingly, voltage VH detected by voltage sensor 192 in FIG. 4 decreases. Until voltage VH decreases to threshold Vth (42 V for example) that is sufficiently lower than a power supply voltage (several hundred volts for example) of power storage device 150, a waiting state is continued in step S53.

In step S53, when the relation VH<Vth is satisfied, the process proceeds to step S54, In step S54, whether system main relay SMR2 is welded is checked. The welding check can be performed by making system main relay SMR2 OFF to disconnect power storage device 150 from voltage sensor 192 and, in this state, detecting voltage V2 by voltage sensor 192.

In step S55, when voltage V2 does not decrease to be smaller than the threshold which is set sufficiently lower than the voltage of power storage device 150, it is determined that power storage device 150 is not disconnected and system main relay SMR2 is welded, and the process proceeds to step S59. In step S59, the result of the determination that system main relay SMR2 is welded is confirmed, stored, or an alarm is issued. In step S60, the process is ended.

In contrast, in step S55, when voltage V2 is not more than the threshold which is set sufficiently smaller than the voltage of power storage device 150, it can be determined that power storage device 150 is disconnected and thus system main relay SMR2 is not welded. In this case, the process proceeds to step S56. In step S56, vehicle ECU 180 controls relay 112 to be OFF in order not to allow electric power to be supplied via secondary coil 120 to rectifier 130 even if secondary self-resonant coil 110 resonates. In step S57, the process is ended.

Figure 9:
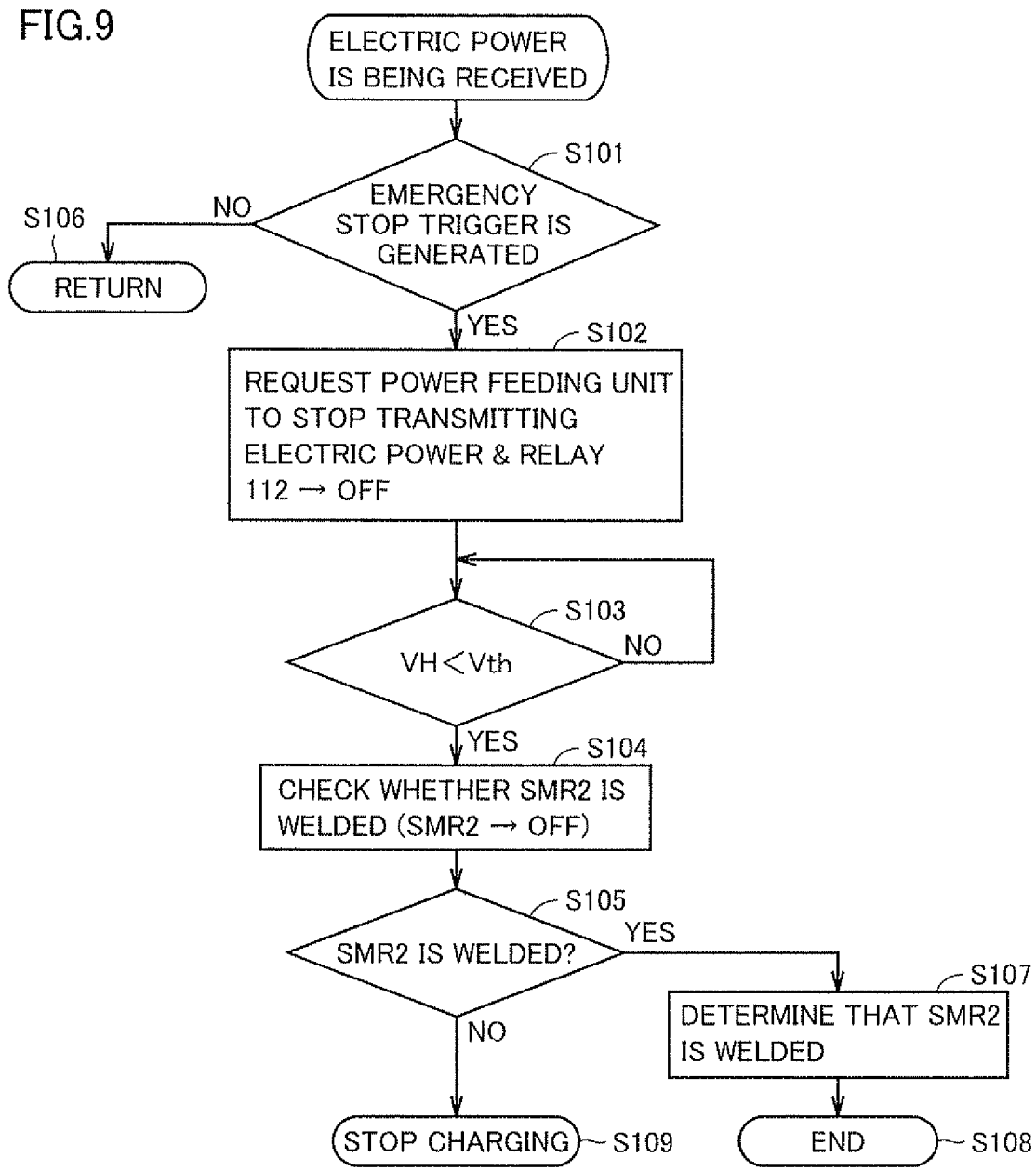
FIG. 9 is a flowchart illustrating a process followed in the case where ongoing reception of electric power is forcedly terminated due to occurrence of an abnormality during the reception of electric power.

FIG. 9 is a flowchart illustrating a process followed in the case where ongoing reception of electric power is forcedly terminated due to occurrence of an abnormality during the reception of the electric power.

Referring to FIG. 9, while the noncontact power receiving apparatus of the vehicle is receiving electric power, whether or not an emergency stop trigger is generated is monitored in step S101. The emergency stop trigger is generated for example when a failure that requires repair occurs to the vehicle, such as when rectifier 130 or DC/DC converter 140 is damaged.

When such an emergency stop trigger is not generated, the process proceeds to step S106 and the control temporarily follows the main routine. In this case, the condition for receiving electric power is satisfied and secondary self-resonant coil 110 is controlled so that the coil can receive electric power. After a predetermined time has elapsed, for example, step S101 is performed again.

In step S101, when generation of the emergency stop trigger is confirmed, the process proceeds to step S102. In step S102, vehicle ECU 180 makes a request via communication device 190 to power feeding apparatus 200 to stop transmitting electric power, and sets relay 112 OFF so that the received electric power is not supplied to rectifier 130 through resonance of secondary self-resonant coil 110.

Then, voltage VH detected by voltage sensor 192 in FIG. 4 decreases. Until voltage VH decreases to threshold Vth (42 V for example) that is sufficiently lower than a power supply voltage (several hundred volts for example) of power storage device 150, a waiting state is continued in step S103.

In step S103, when the relation VH<Vth is satisfied, the process proceeds to step S104. In step S104, whether or not system main relay SMR2 is welded is checked. The welding check can be conducted by making system main relay SMR2 OFF to disconnect power storage device 150 from voltage sensor 191 and detecting, in this state, voltage V2 by voltage sensor 191.

In step S105, when voltage V2 does not decrease to be lower than the threshold which is set sufficiently lower than the voltage of power storage device 150, it is determined that power storage device 150 is not disconnected and system main relay SMR2 is welded. Then, the process proceeds to step S107. In step S107, the result of the determination that system main relay SMR2 is welded is confirmed, stored, or an alarm is issued. In step S108, the process is ended.

In contrast, in step S105, when voltage V2 is not more than the threshold which is sufficiently lower than the voltage of power storage device 150, it can be determined that power storage device 150 is disconnected and system main relay SMR2 is not welded. In this case, the process proceeds to step S109 and charging is stopped.

As heretofore described, the noncontact power receiving apparatus in the first embodiment includes relay 112 attached between secondary coil 120 and rectifier 130, in order to cut off the electric power being received, when the result of diagnosis for failure of the vehicle on the power receiving side is "fail" in the system of transferring electric power in noncontact manner by means of the resonance method. Here, relay 112 may be replaced with a semiconductor switch. When a fail is detected while the vehicle is receiving electric power, the electric power being received can be immediately cut off by means of this relay 112.

Second Embodiment

A second embodiment differs from the first embodiment in that the configuration of relay 112 shown in FIGS. 4 and 6 is changed. The configurations of other components are similar to those of the first embodiment, and therefore, the description thereof will not be repeated.

Figure 10:
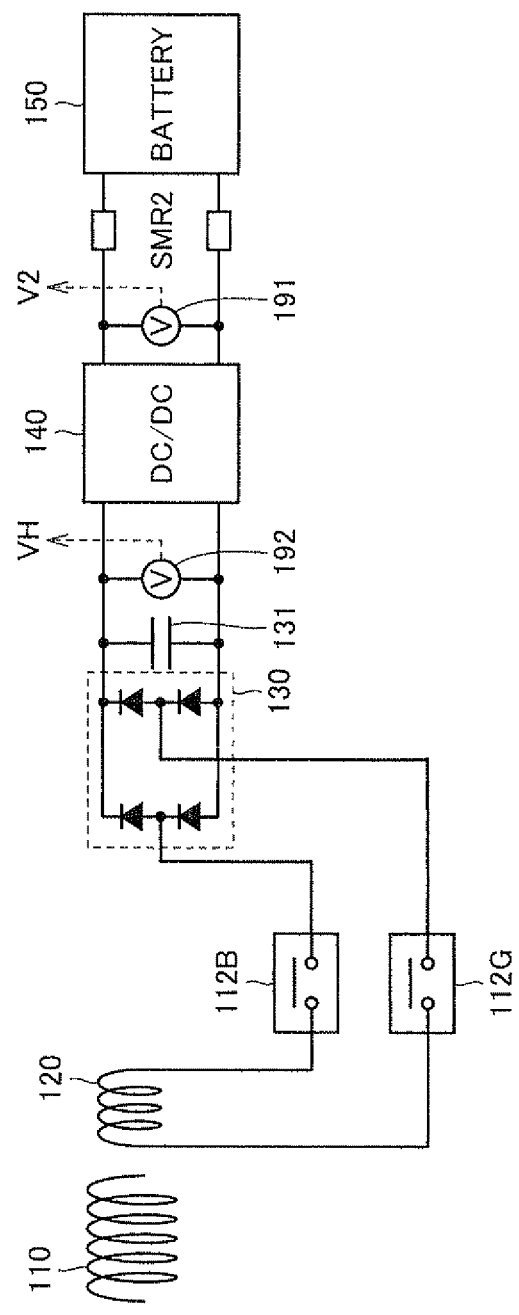
FIG. 10 is a circuit diagram for illustrating arrangement of relays in a second embodiment.

FIG. 10 is a circuit diagram for illustrating arrangement of relays in the second embodiment.

Referring to FIG. 10, secondary coil 120 for receiving electric power is placed in the vicinity of secondary self-resonant coil 110 to be resonated. One end of secondary coil 120 is connected via a relay 112B to rectifier 130, and the other end of the power reception coil is connected via a relay 112G to rectifier 130. A difference between the second embodiment and the first embodiment is that this relay 112G is added. Even when a failure that relay 112B is welded occurs, relay 112G may be made OFF to cut off the electric power being received.

Rectifier 130 is configured for example with a diode bridge. The voltage rectified by rectifier 130 is smoothed by a smoothing capacitor 131. The smoothed voltage is detected as voltage VH by voltage sensor 192. Voltage VH is provided to DC/DC converter 140 operating as a charger.

DC/DC converter 140 converts the voltage provided from rectifier 130 into a voltage appropriate for charging power storage device 150. Between DC/DC converter 140 and power storage device 150, system main relay SMR2 is provided.

The relay in FIG. 10 corresponding to relay 112 shown in FIG. 4 thus includes a pair of relays (relays 112B, 112G) connected respectively to the opposite ends of secondary coil 120. As shown in FIGS. 1 and 4, the noncontact power receiving apparatus on the vehicle further includes communication device 190 for communicating with power feeding apparatus 200 transmitting electric power by means of the power transmission coil (240), and vehicle ECU 180 for controlling relay 112 and system main relay SMR2. After vehicle ECU 180 confirms, through the cutoff confirming operation, that system main relay SMR2 is normally cut off, vehicle ECU 180 causes one of the relays (112B, 112G) of the pair to be in a connecting state and causes the other relay to be in a cutoff state, requests, by means of communication device 190, power feeding apparatus 200 to transmit electric power, and confirms whether the other relay of the pair is normally controlled to be in a cutoff state.

More preferably, the noncontact power receiving apparatus further includes first voltage sensor 191 for detecting voltage V2 on a power transmission path connecting DC/DC converter 140 and system main relay SMR2, and second voltage sensor 192 for detecting voltage VH on a power transmission path connecting rectifier 130 and DC/DC converter 140, Vehicle ECU 180 requests power feeding apparatus 200 to transmit electric power and, when voltage VH detected by voltage sensor 192 does not increase, vehicle ECU 180 determines that the other relay of the pair is normally cut off.

Still more preferably, when vehicle ECU 180 determines that the other relay (112B) of the pair is normally cut off, vehicle ECU 180 requests power feeding apparatus 200 to temporarily stop transmitting electric power, controls the one relay (112G) of the pair to be in a cutoff state and controls the other relay (112B) of the pair to be in a connecting state, requests again power feeding apparatus 200 to transmit electric power, and confirms whether the one relay (112G) of the pair is normally cut off.

Still more preferably, after vehicle ECU 180 confirms that both of the other relay (112B) and the one relay (112G) of the pair can be normally cut off, vehicle ECU 180 controls both of the relays (112G, 112B, SMR2) to be in a connecting state, requests power feeding apparatus 200 to transmit electric power, and causes the load (150) to be supplied with the electric power.

A charging start process in the second embodiment as described above will hereinafter be described in detail by means of a flowchart.

Figure 11:
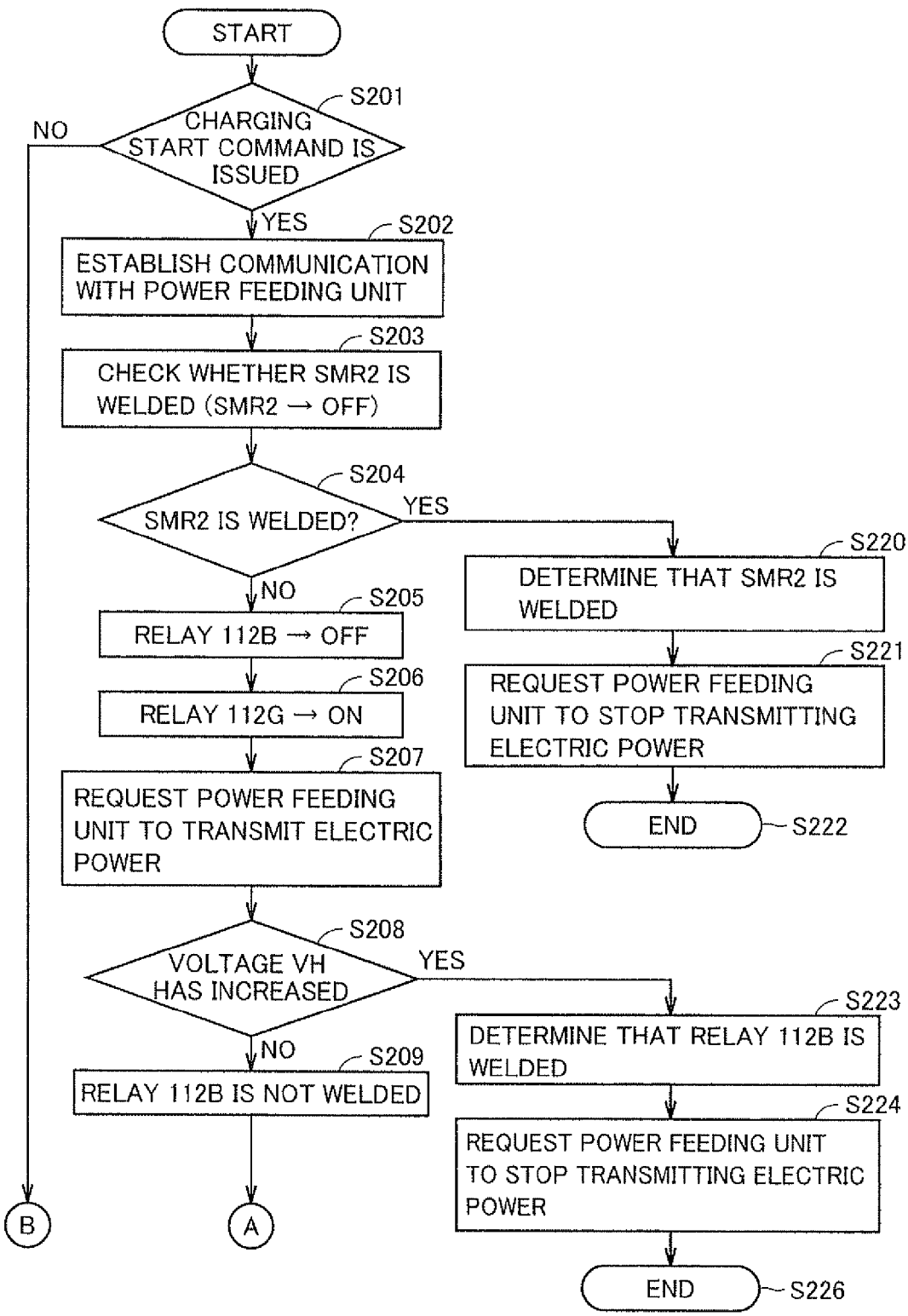
FIG. 11 is a first part of a flowchart for illustrating a charging start process executed by a vehicle ECU 180 in the second embodiment.
Figure 12:
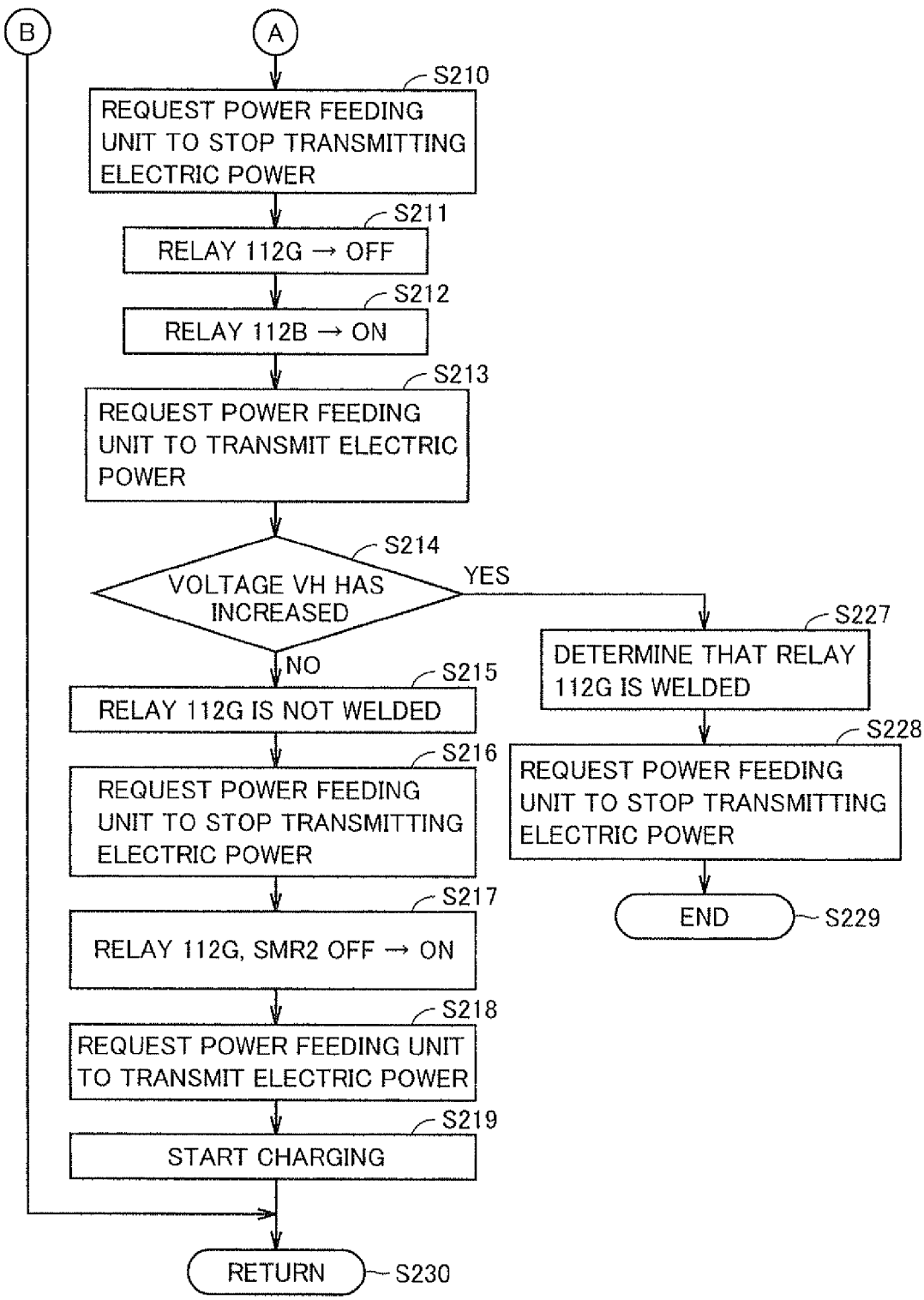
FIG. 12 is a second part of the flowchart for illustrating the charging start process executed by vehicle ECU 180 in the second embodiment.

FIGS. 11 and 12 show the flowchart for illustrating the charging start process executed by vehicle ECU 180 in the second embodiment. The process of this flowchart is called from a predetermined main routine and executed. The configurations in FIGS. 1 and 4 are common to the first and second embodiments, and are referenced as appropriate in the following description.

Referring to FIG. 11, in step S201, it is determined first whether or not a charging start command has been issued. The charging start command is provided, for example, in response to pressing of a charging start button by a person in the vehicle. In step S201, when the charging start command has been provided, the process proceeds to step S202. When the charging start command has not been issued in step S201, the control is returned to the main routine in step S230 of FIG. 12.

When the process proceeds to step S202, vehicle ECU 180 uses communication device 190 in FIG. 1 to establish communication with power feeding apparatus 200. In step S203, whether or not system main relay SMR2 is welded is checked. When system main relay SMR2 is rendered OFF and it is confirmed that voltage V2 detected by voltage sensor 191 in FIG. 4 decreases to be smaller than a predetermined threshold that is set lower than the voltage of power storage device 150, it is seen that system main relay SMR2 has been normally made OFF and thus has not been welded. In step S204, a determination as to the welding check in step S203 is made.

In step S204, when it is determined that SMR2 is welded, the process proceeds to step S220, and the result of the determination that SMR2 is welded is confirmed, stored, or an alarm is issued. Then, in step S221, vehicle ECU 180 makes a request via communication device 190 to power feeding apparatus 200 to stop transmitting electric power. Then, in step S222, the process is terminated.

In step S204, when it is determined that SMR2 is not welded, the process proceeds to step S205. In step S205, vehicle ECU 180 controls relay 112B in FIG. 10 that is provided between one end of secondary coil 120 and rectifier 130, so that relay 112B is rendered OFF. Further, in step S206, vehicle ECU 180 controls relay 112G provided between the other end of secondary coil 120 and rectifier 130, so that relay 112G is rendered ON. In this state, whether or not relay 112B is welded is checked.

In step S207, vehicle ECU 180 makes a request via communication device 190 to power feeding apparatus 200 to transmit electric power.

When electric power is transmitted from power feeding apparatus 200, primary self-resonant coil 240 is controlled with the resonance frequency. If relay 112B is welded, the electric power received by secondary self-resonant coil 110 through the resonance is provided via secondary coil 120 to rectifier 130. Then, the electric power is transmitted to cause voltage VH to increase. In contrast, if relay 112B is normally cut off, the electric power is not input to rectifier 130 and thus voltage VH should not increase.

Therefore, in step S208, whether or not voltage VH has increased is determined. The determination here that voltage VH has increased may be made on the condition that an increase of voltage VH is detected. Alternatively, the determination that voltage VH has not increased may be made on the condition that voltage VH does not exceed predetermined threshold V2 lower than voltage V1 for charging, after a predetermined time has elapsed. In step S208, when an increase of voltage VH is detected, the process proceeds to step S223. In step S223, the result of the determination that relay 112B is welded is confirmed, stored, or an alarm is issued, Then, in step S224, vehicle ECU 180 makes a request via communication device 190 to power feeding apparatus 200 to stop transmitting electric power. In step S226, the process is ended.

In contrast, in step S208, when an increase of voltage VH is not detected, the process proceeds to step S209. In step S209, it is determined that relay 112B has been normally rendered OFF and thus has not been welded.

Referring to FIG. 12, in subsequent step S210, vehicle ECU 180 makes a request via communication device 190 to power feeding apparatus 200 to temporarily stop transmitting electric power in order to switch connection of the relays.

In step S211, vehicle ECU 180 controls relay 112G provided between the other end of secondary coil 120 and rectifier 130 so that relay 112G is made OFF. Further, in step S212, vehicle ECU 180 controls relay 112B provided between the one end of secondary coil 120 and rectifier 130 so that relay 112B is made ON. In this state, whether relay 112G is welded or not is checked.

In step S213, vehicle ECU 180 makes a request via communication device 190 to power feeding apparatus 200 to transmit electric power.

When electric power is transmitted from power feeding apparatus 200, primary self-resonant coil 240 is controlled with the resonance frequency. If relay 112O is welded, the electric power received by secondary self-resonant coil 110 through the resonance is provided via secondary coil 120 to rectifier 130. Then, the electric power is transmitted to cause voltage VH to increase. In contrast, if relay 112G is normally cut off, the electric power is not input to rectifier 130 and thus voltage VH should not increase.

Therefore, in step S214, whether or not voltage VH has increased is determined. The determination here that voltage VH has increased is made on the condition that an increase of voltage VH is detected. Alternatively, the determination that voltage VH has not increased may be made on the condition that voltage VH does not exceeds predetermined threshold V3 (=threshold V2 in S208) lower than voltage V1 for charging, after a predetermined time has elapsed. In step S214, when an increase of voltage VH is detected, the process proceeds to step S227. In step S227, the result of the determination that relay 112G is welded is confirmed, stored, or an alarm is issued. Then, in step S228, vehicle ECU 180 makes a request via communication device 190 to power feeding apparatus 200 to stop transmitting electric power. In step S229, the process is ended.

In contrast, in step S214, when an increase of voltage VH is not detected, the process proceeds to step S215. In step S215, it is determined that relay 112G has been normally made OFF and thus has not been welded. In step S216, vehicle ECU 180 makes a request via communication device 190 to power feeding apparatus 200 to temporarily stop transmitting electric power, in order to switch connection of the relays.

In step S217, vehicle ECU 180 controls relay 112G and system main relay SMR2 having been controlled to be OFF, so that these relays are controlled to be ON. In subsequent step S218, vehicle ECU 180 makes a request via communication device 190 to power feeding apparatus 200 to transmit electric power, and the charging process is started in step S219. Voltage VH is controlled to be charging voltage V1 (>open circuit voltage VB of the power storage device). In subsequent step S230, the control is returned to the main routine.

The process for normal termination is as follows. In the flowchart of FIG. 8, instead of controlling relay 112 to be OFF in step S56, one or both of relays 112B and 112G may be controlled to be OFF.

The process for abnormal termination is as follows. In the flowchart of FIG. 9, instead of making a request to power feeding apparatus 200 to stop transmitting electric power and controlling relay 112 to be OFF in step S102, a request may be made to power feeding apparatus 200 to stop transmitting electric power and one or both of relays 112B and 112G may be controlled to be OFF.

As heretofore described, the noncontact power receiving apparatus in the second embodiment includes relays 112B and 112G attached between secondary coil 120 and rectifier 130, in order to cut off the electric power being received, when the result of diagnosis for failure of the vehicle on the power receiving side is "fail" in the system of transferring electric power in noncontact manner by means of the resonance method. Here, relays 112B and 112G may be replaced with semiconductor switches. When a fail is detected while the vehicle is receiving electric power, the electric power being received can be immediately cut off by cutting off at least one of relays 112E and 112G.

Although the above embodiments each have been described in connection with the series/parallel hybrid vehicle, as an electrically-powered vehicle, capable of splitting the motive power of engine 176 by power split device 177 so that the motive power can be transmitted to drive wheel 178 and motor generator 172 as shown in FIG. 4, the present invention is applicable as well to hybrid vehicles of other types. Specifically, for example, the present invention is also applicable to vehicles such as a so-called series hybrid vehicle using only engine 176 for driving motor generator 172 and using only motor generator 174 for generating driving force for the vehicle, a hybrid vehicle recovering, as electrical energy, only the regenerative energy from the kinetic energy generated by engine 176, and a motor-assisted hybrid vehicle using the engine as a main motive power source and assisted by a motor as required.

Further, the present invention is also applicable to vehicles such as an electric vehicle without engine 176 that travels using electric power only, and a fuel cell vehicle including a fuel cell as a DC electric power source in addition to a power storage device 150. The present invention is also applicable to an electrically-powered vehicle without voltage step-up converter 162.

It should be construed that the embodiments disclosed herein are by way of illustration in all respects, not by way of limitation. It is intended that the scope of the present invention is defined by claims, not by the above description of the embodiments, and includes all modifications and variations equivalent in meaning and scope to the claims.

The invention claimed is:

1. A noncontact power receiving apparatus for an electrically-powered vehicle, receiving electric power from a power transmission coil transmitting the electric power received from a power supply, the noncontact power receiving apparatus comprising:
 a power reception coil configured to receive electric power transmitted from the power transmission coil;
 a rectifier configured to rectify the electric power received by the power reception coil;
 a power storage device configured to receive the electric power rectified by the rectifier;
 a first relay provided on a path between the power reception coil and the rectifier;
 a second relay provided on a path between the rectifier and the power storage device; and
 a control unit configured to perform a cutoff confirming operation of the first relay after performing a cutoff confirming operation of the second relay, wherein
 the cutoff confirming operation of the second relay includes detecting a voltage on a power transmission path connecting the rectifier and the second relay while commanding the second relay to cut off, and
 the cutoff confirming operation of the first relay includes detecting a voltage on a power transmission path connecting the rectifier and the first relay while commanding the first relay to cut off.

2. The noncontact power receiving apparatus according to claim 1, further comprising:
 a first voltage detection unit configured to detect the voltage on the power transmission path connecting the rectifier and the second relay, wherein
 the control unit is configured to perform the cutoff confirming operation of the second relay to confirm that the second relay is properly performing the cutoff by detecting the voltage on the power transmission path connecting the rectifier and the second relay when the power transmission coil does not transmit electric power and while commanding the second relay to cut off.

3. The noncontact power receiving apparatus according to claim 2, further comprising:
 a second voltage detection unit configured to detect the voltage on the power transmission path connecting the rectifier and the first relay, wherein
 after the control unit confirms, through the cutoff confirming operation of the second relay, that the second relay is properly performing the cut off, the control unit performs the cutoff confirming operation of the first relay by detecting the voltage on the power transmission path connecting the rectifier and the first relay when the power transmission coil transmits electric power and while commanding the first relay to cut off.

4. The noncontact power receiving apparatus according to claim 3, further comprising a communication unit that communicates with a power feeding apparatus that transmits electric power by the power transmission coil, wherein
 after the control unit confirms, through the cutoff confirming operation of the second relay, that the second relay is properly performing the cut off, the control unit causes the first relay to be in a connecting state, and requests, by the communication unit, the power feeding apparatus to transmit electric power.

5. The noncontact power receiving apparatus according to claim 2, further comprising:
 a second voltage detection unit configured to detect the voltage on the power transmission path connecting the rectifier and the first relay; and
 a communication unit that communicates with a power feeding apparatus that transmits electric power by the power transmission coil, wherein
 after the control unit requests, by the communication unit, the power feeding apparatus to stop transmitting electric power, the control unit controls the second relay to cut off the transmission of the electric power to the power storage device and, when the voltage detected by the second voltage detection unit becomes not more than a predetermined value, the control unit determines whether the second relay is properly performing the cut off, based on the voltage detected by the first voltage detection unit.

6. The noncontact power receiving apparatus according to claim 5, wherein
 when the control unit determines that the second relay is properly performing the cut off, the control unit controls the first relay to cut off the transmission of the electric power to the rectifier, and terminates reception of the electric power.

7. The noncontact power receiving apparatus according to claim 2, wherein
 when reception of the electric power is normally terminated, the control unit causes the first relay to cut off the transmission of the electric power after causing the second relay to cut off the transmission of the electric power and, when reception of the electric power is abnormally terminated, the control unit causes the first relay to cut off the transmission of the electric power before causing the second relay to cut off the transmission of the electric power.

8. The noncontact power receiving apparatus according to claim 3, wherein
 the first relay includes a pair of relays connected respectively to opposite ends of the power reception coil,
 the noncontact power receiving apparatus further comprises a communication unit that communicates with a power feeding apparatus that transmits electric power by the power transmission coil, and
 after the control unit confirms, through the cutoff confirming operation of the second relay, that the second relay is properly performing the cut off, the control unit causes one of the relays of the pair to be in a connecting state and causes the other relay to be in a cutoff state, requests, by the communication unit, the power feeding apparatus to transmit electric power, and confirms whether the other relay of the pair is in the cutoff state.

9. The noncontact power receiving apparatus according to claim 8, wherein
 the control unit requests the power feeding apparatus to transmit electric power and, when the voltage detected by the second voltage detection unit does not increase, the control unit determines that the other relay of the pair is properly in the cutoff state.

10. The noncontact power receiving apparatus according to claim 9, wherein
 when the control unit determines that the other relay of the pair is properly in the cutoff state, the control unit requests the power feeding apparatus to temporarily stop transmitting electric power, controls the one relay of the pair to be in a cutoff state and controls the other relay of the pair to be in a connecting state, requests again the power feeding apparatus to transmit electric power, and confirms whether the one relay of the pair is properly in the cutoff state.

11. The noncontact power receiving apparatus according to claim 10, wherein after the control unit confirms that both of the other relay and the one relay of the pair can be placed into the cutoff state, the control unit controls both of the first relay and the second relay to be in a connecting state, requests the power feeding apparatus to transmit electric power, and causes the power storage device to be supplied with the electric power.

12. An electrically-powered vehicle comprising:

a noncontact power receiving apparatus that receives electric power from a power transmission coil that transmits the electric power received from a power supply, the noncontact power receiving apparatus including:

a power reception coil configured to receive electric power transmitted from the power transmission coil;

a rectifier configured to rectify the electric power received by the power reception coil;

a power storage device configured to receive the electric power rectified by the rectifier;

a first relay provided on a path between the power reception coil and the rectifier;

a second relay provided on a path between the rectifier and the power storage device; and a control unit configured to perform a cutoff confirming operation of the first relay after performing a cutoff confirming operation of the second relay; and a motor coupled to the power storage device so as to be driven by power from the noncontact power receiving apparatus, wherein the cutoff confirming operation of the second relay includes detecting a voltage on a power transmission path connecting the rectifier and the second relay while commanding the second relay to cut off, and the cutoff confirming operation of the first relay includes detecting a voltage on a power transmission path connecting the rectifier and the first relay while commanding the first relay to cut off.

13. The electrically-powered vehicle according to claim 12, wherein the noncontact power receiving apparatus further includes:

a voltage conversion unit coupled between the rectifier and the power storage device and configured to convert a voltage of the electric power rectified by the rectifier and supplied to the power storage device, wherein the second relay is provided on a path between the voltage conversion unit and the power storage device to selectively cut off transmission of the electric power from the voltage conversion unit to the power storage device.

* * * * *